July 16, 1968  W. J. VAKOUSKY, JR  3,392,475
SEINE FLOAT
Filed July 1, 1965

INVENTOR.
WALTER J. VAKOUSKY
BY
*James R. Lindsay*
ATTY.

3,392,475
SEINE FLOAT
Walter J. Vakousky, Jr., Seymour, Conn., assignor to The B. F. Goodrich Company, New York, N.Y., a corporation of New York
Filed July 1, 1965, Ser. No. 468,892
4 Claims. (Cl. 43—44.9)

ABSTRACT OF THE DISCLOSURE

A seine float with a water-impermeable buoyant closed-cell cellular plastic body having an opening therethrough is provided with a water-impermeable essentially non-porous plastic grommet in each mouth of the opening. The grommets each have a bore which is in alignment with the said opening and are formed of a plastic material fusible with the plastic material from which the cellular body of the float is formed. The grommets and the cellular body are fused together at the interfaces therebetween to provide an integral structure.

---

This invention relates to seine floats and pertains more particularly to a seine float provided with integral grommets at the mouths of a channel that extends through the float and through which the line for attaching the float to the fish net is threaded when the float is in use.

Although seine floats used for supporting seine fish nets for many years were made from cork, in recent years such floats have been constructed from water-impermeable closed-cell cellular plastic materials because of the many advantages which such plastic materials possess over cork. The floats are attached to the net by threading a line or rope through a channel extending longitudinally through the center of the float and by lashing the net to the line at spaced intervals along the line and between adjacent floats threaded onto the line. Attachment of the floats to the net in this manner allows the floats to slide along the line the distance between adjacent lashings on either side of the float.

One difficulty experienced with cork seine floats also is encountered with seine floats made of cellular plastic, namely, the tendency of the line that is threaded through the float to cut the cellular plastic material when the nets are pulled in. The tendency for the line to cut the float results from the extremely high stresses developed by the line straining against the float at the orifices of the channel through which the line is threaded when the float is drawn over the power block as the net is pulled into the boat.

The tendency for the float to be torn by the line as a result of such stresses can be reduced by increasing the density of the cellular plastic material from which the float is made. However, to do so materially increases the cost of the float and, also, objectionably affects the buoyancy of the float. Such procedure for overcoming the difficulty, accordingly, has not been considered to be entirely satisfactory. Another proposal which has been proffered involves cementing a metal sleeve in the channel of the float. Although the use of the metal sleeve offers protection against the line tearing the cellular plastic material of the float, it has been experienced that the bond between the sleeve and the body of the float developed by the adhesive used to cement the sleeve in place is not sufficient to withstand the severe stresses to which the float normally is subjected in use and separation of the sleeve from the cellular plastic body of the float frequently occurs relatively soon after the float has been put into service.

In accordance with the present invention, grommets are provided at the mouths of the channel through which the line is threaded which grommets are fused during the manufacture of the float with the cellular plastic body of the float so as to form an integral one-piece construction. The grommets are essentially non-cellular and provide sufficient tear resistance to withstand the stresses placed on the float when the net is pulled into the boat. Since the material from which the grommets are made actually is fused with the plastic material from which the cellular body of the float is formed, no separation of the grommets from the float is experienced during the normal service life of the float.

The invention will be more fully understood from the following description of an embodiment of the present invention and from the drawing in which.

Figure 1:
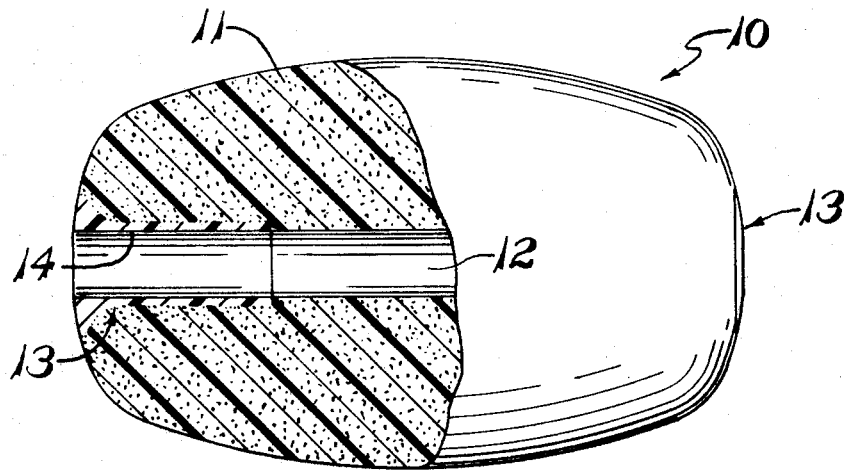
FIG. 1 is an elevation view, partly broken away and in section, of a seine float embodying the present invention.

Referring to the drawing, and particularly to FIG. 1, the seine float 10 is comprised of a water-impermeable buoyant closed-cell cellular plastic body member 11 that has a generally cylindrical-shaped opening 12 extending longitudinally therethrough. A grommet 13, 13 of essentially non-porous water-impermeable material is provided at each orifice of the opening 12 and is positioned with its bore 14 in alignment with opening 12 so that a line can be threaded conveniently through the float 10. Preferably the cross-sectional shape and size of the bore 14 of each grommet 13, 13 is the same as that portion of opening 12 situated between the innermost reaches of the opposed grommets 13, 13 so that the float is provided with a conduit of uniform cross-sectional shape and size. Desirably, the exposed exterior end of each grommet 13, 13 is flanged to provide greater resistance to tearing at the mouths of the conduit running through the float. The non-porous material of each grommet 13, 13 is fused with the cellular material of the body member 11 at the interface therebetween in order to produce an integral one-piece construction in which the grommets 13, 13 are so intimately united with the cellular body member 11 that they will not become detached from the body member 11 during normal use of the float 10.

In order to accomplish the fusion of the grommets 13, 13 with the body member 11 of the float, it is necessary that the material from which the grommets 13, 13 are produced be capable of fusing with the material from which the body member 11 is formed at a temperature which is not objectionably high. Desirably, the material from which the grommets 13, 13 are formed in a thermoplastic material that has sufficient plasticity at the temperature at which the closed-cell body member 11 is formed that union of the grommets 13, 13 with the body member 11 is readily accomplished and is maintained even when the finished float is allowed to cool to room temperature. The fusion of the material from which the grommets 13, 13 are formed with the material from which the cellular body member 11 is formed may result from an actual melting of the materials at the interface therebetween or as a result of a solvent contained in one of the materials actually dissolving temporarily the material of the other at the interface or as a result of both heat fusion and solvent fusion. Preferably, the plastic material from which the grommets 13, 13 are formed and the plastic material from which the body member 11 is formed are essentially the same composition, varying in composition, if at all, in compounding ingredients added to the polymer to modify slightly the physical properties of the composition without changing the predominant characteristics of the composition. For example, both the grommets 13, 13 and the body member 11 may be formed of vinyl chloride polymer compositions which are the same except that the composition from which the grommets 13, 13 are formed may have less plasticizer added thereto than the composition from which the body member 11 is formed.

The body member 11 of the float 10 may be formed of any water-impermeable closed-cell cellular plastic material that exhibits sufficient impact strength to withstand the normal stresses to which the floats are subjected as the fish nets are pulled into the boats and that is not adversely affected by water. Generally, it is desirable for the cellular body member 11 to have some degree of resiliency so as to be capable of absorbing compressive forces without shattering.

Floats in which the closed-cell cellular body member 11 is formed of a vinyl chloride polymer composition and in which the grommets 13, 13 also are formed of a vinyl chloride polymer composition have been found to be particularly serviceable. The vinyl chloride polymers most frequently used include polyvinyl chloride (a homopolymer of vinyl chloride) and copolymers of vinyl chloride with vinyl acetate, vinylidene chloride or maleic acid esters. To the vinyl chloride polymers there generally are added various compounding ingredients including plasticizers, stabilizers, fillers, and colorants (when it is desired that a product have a certain color). The plasticizers most frequently added to vinyl chloride polymer compositions include dioctyl phthalate, butyl decyl phthalate, dioctyl adipate, dioctyl sebacate, tricresyl phosphate, trioctyl phosphate, didecyl phthalate and acetyl tributyl citrate.

Figure 2:
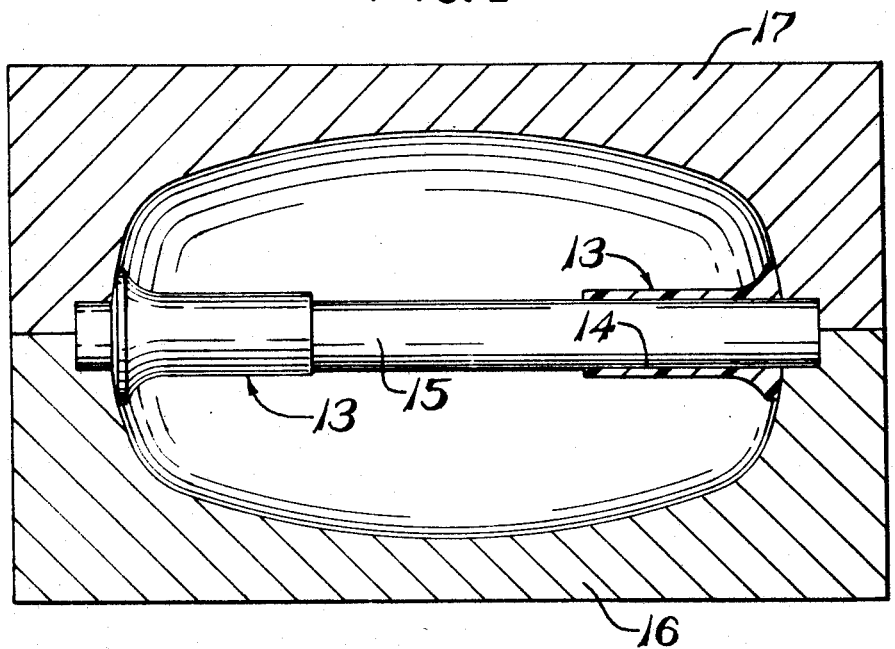
FIG. 2 is an elevation view in section of a mold in which the seine float of FIG. 1 is formed and showing a mandrel positioned in the mold with pre-molded grommets in proper position thereon, one of said grommets being in section.
Figure 3:
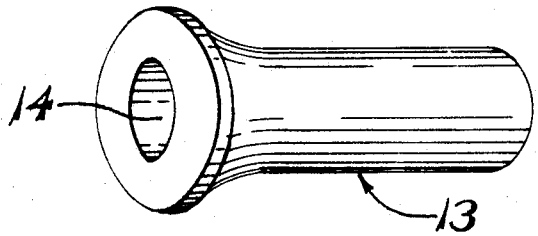
FIG. 3 is a perspective view of a pre-formed grommet employed in the manufacture of the seine float shown in FIG. 1.

The float 10 may be manufactured by any convenient process, although the manner illustrated by FIG. 2 indicates the preferred method for forming the float. Referring to FIG. 2, it will be understood that the float preferably is produced by first pre-molding the grommets 13, 13 and then positioning the pre-molded grommets 13, 13 on a mandrel 15 which may be made of steel. The mandrel 15 with grommets 13, 13 positioned in a spaced relationship thereon next is placed in a mold comprised of a bottom mold section 16 and a top mold section 17. When the mold is closed, the void in the mold cavity formed by the mold sections 16 and 17 and the mandrel 15 with grommets 13, 13 positioned thereon with the exterior end faces of the flanged portions of the grommets 13, 13 abutting against the mold sections is essentially the shape of the body member 11 to be formed about the grommets 13, 13, although desirably of somewhat smaller dimensions than those of the body member 11 in the finished product to permit expansion of the body member 11 after the molded product is removed from the mold. Next the mold is closed and the plastic composition for producing the closed-cell cellular body member is introduced into the cavity of the mold. The mold is heated, desirably under pressure, to cause the setting or gelling of the injected plastic material and the union by fusion thereof with the grommets 13, 13. Thereafter, the molded article is removed from the mold and normally is heated further to cause complete expansion of the body member 11 to a final desired size. The finished float then is permitted to cool to room temperature. Some blowing agent in the plastic composition for producing the body member may migrate from the plastic composition into the plastic material of the grommets during the heating of the materials in the mold so that after the molded article is removed from the mold some porosity may result in the grommets in the area adjacent the body member but such porosity does not extend entirely through the thickness of the grommet and the grommet is still considered to be essentially non-porous.

The formation of the closed-cell cellular structure of the body member 11 can be accomplished in various ways which are known to the art. Generally, a chemical blowing agent which decomposes upon heating is employed, however, to cause the desired expansion. The expansion into a cellular structure of the material injected into the mold need not take place in the mold but may occur after the material is set in the mold and the molded article is removed from the mold. When this procedure is used, the cavity of the mold is smaller than the dimensions of the body member 11 desired to be formed and the entire cavity is filled under pressure with the material from which the body member 11 is to be formed. The mold is maintained tightly closed and under pressure and is heated until the material is set and the chemical blowing agent is at least partially decomposed. Expansion of the plastic material introduced into the mold cavity is prevented from occurring at this time, however, as a result of the restraint imposed upon the material by the mold. The time that the material must be heated in the mold will vary, of course, with the material being used to form the body member of the float, with the temperature being employed and with the size of the float being formed, although heating the mold for a period of from 10 to 30 minutes at a temperature of 220° F. to 330° F. usually is sufficient. After a suitable period of heating, the molded product is removed from the mold. When the mold is opened, the gaseous decomposition product produced by the decomposition of the chemical blowing agent during the heating period causes the set or gelled plastic material to expand into a closed-cell cellular structure. By controlling the temperature of the atmosphere surrounding the product after it is removed from the mold, a controlled degree of expansion can be realized. The process described in U.S. Patent 2,737,503 is particularly useful for producing the closed-cell cellular plastic body member of the float when the body member of the float is to be formed of a vinyl chloride polymer composition.

A float formed in accordance with this invention was produced by pre-molding grommets 13, 13 from a polyvinyl chloride composition that contained about 70 parts by weight of dioctyl phthalate per 100 parts by weight of polyvinyl chloride polymer. In addition, the composition contained about 12 parts by weight of basic lead silicate (a heat stabilizer), about 3 parts by weight of a conventional barium-sodium organic complex light stabilizer for polyvinyl chloride polymer and about 3 parts by weight of a blue colorant per 100 parts by weight of the polyvinyl chloride polymer. The pre-molded grommets were positioned on a steel mandrel and placed in a two-section mold such as is illustrated in FIG. 2. A polyvinyl chloride polymer composition of the following formulation then was introduced into the mold until the mold cavity was filled.

| Material: | Parts by weight |
|---|---|
| Polyvinyl chloride | 100.0 |
| Dinitroso pentamethylene tetramine (blowing agent) | 30.0 |
| Petroleum naphtha | 30.0 |
| Acetone | 70.0 |
| Basic lead silicate (heat stabilizer) | 12.0 |
| Barium-sodium organic complex (light stabilizer) | 3.0 |
| Dioctyl phthalate | 30.0 |
| Tricresyl phosphate | 30.0 |
| Phthalic anhydride | 15.0 |
| Zinc stearate | 5.0 |

The closed mold was heated at about 320° F. under about 2,000 pounds per square inch pressure for about 25 minutes. During this heating operation the vinyl chloride polymer composition injected into the mold cavity gelled and the chemical blowing agent included in the composition decomposed. However, since the mold cavity was filled to capacity before the heating of the mold began, expansion of the gelled material into a cellular structure was prevented. The material injected into the mold fused during the heating operation with the pre-molded grommets positioned in the mold causing an intimate union of the grommets with the gelled material. After cooling the mold was opened and the molded product was removed from the mold whereupon expansion of the gelled vinyl chloride polymer composition occurred. The float then was heated in an air oven maintained at 225° F. for 6 hours to accomplish final expansion of the body member of the float to the desired cellular density. The expansion of the molded product caused the dimensions of the float to increase in length and in height by a factor of about 2.15. At the temperature at which the expansion took place, the material from which the grommets 13, 13 were formed had sufficient plasticity that some change in the dimensions of the grommets 13, 13 occurred, although the change was not found to be objectionable. The finished float upon being allowed to cool to room temperature measured 4 inches in length and 3 inches in height and a ¾ inch diameter channel extending longitudinally through the center of the float. Floats constructed as described above were tested under actual service conditions and exhibited no tendency for the grommets to become separated from the cellular body member of the float during the normal service life of the floats.

I claim:

1. A seine float comprising a water-impermeable, bouyant closed-cell cellular plastic body member having an opening extending therethrough, and a grommet positioned in each mouth of the said opening of said body member, each of said grommets having a bore extending therethrough which bore is in alignment with the said opening in said body member whereby a channel through said seine float is provided through which a line for securing the seine float to a fish net can be threaded, said grommets being formed of a water-impermeable essentially non-porous plastic material fusible with the plastic material from which said body member is formed, said grommets and said body member being fused together at the interfaces therebetween to provide an integral structure.

2. A seine float comprising a water-impermeable bouyant closed-cell cellular plastic body member having a generally cylindrical-shaped opening extending therethrough, and a grommet positioned in each mouth of the said opening of said body member with their innermost ends positioned in spaced relation, each of said grommets having a cylindrical-shaped bore extending therethrough which bore is in alignment with the said opening of the body member and of the same cross-sectional diameter as the cross-sectional diameter of that portion of said opening of the body member situated between the innermost reaches of the opposed grommets whereby a channel of uniform cross-sectional shape and size is provided in said seine float through which a line for securing the seine float to a fish net can be threaded, said grommets being formed of a water-impermeable essentially non-porous plastic material fusible with the plastic material from which said body member is formed, said grommets and said body member being fused together at the interfaces therebetween to provide an integral structure.

3. A seine float comprising a water-impermeable, buoyant closed-cell cellular plastic body member having a generally cylindrical-shaped opening extending therethrough, and a grommet positioned in each mouth of the said opening of said body member with their innermost ends positioned in spaced relation, each of said grommets having a cylindrical-shaped bore extending therethrough which bore is in alignment with the said opening of the body member and of the same cross-sectional diameter as the cross-sectional diameter of that portion of said opening of the body member situated between the innermost reaches of the opposed grommets whereby a channel of uniform cross-sectional shape and size is provided in said seine float through which a line for securing the seine float to a fish net can be threaded, the exposed exterior end of each grommet being flanged, said grommets being formed of a water-impermeable essentially non-porous plastic material fusible with the plastic material from which said body member is formed, said grommets and said body member being fused together at the interfaces therebetween to provide an integral structure.

4. A seine float comprising a water-impermeable, bouyant closed-cell cellular vinyl chloride polymer composition body member having a generally cylindrical-shaped opening extending therethrough, and a grommet positioned in each mouth of the said opening of said body member with their innermost ends positioned in spaced relation, said grommets being formed of essentially non-porous vinyl chloride polymer composition, each of said grommets having a cylindrical-shaped bore extending therethrough which bore is in alignment with the said opening of the body member and of the same cross-sectional diameter as the cross-sectional diameter of that portion of said opening of the body member situated between the innermost reaches of the opposed grommets whereby a channel of uniform cross-sectional shape and size is provided in said seine float through which a line for securing the seine float to a fish net can be threaded, the exposed exterior end of each grommet being flanged, said grommets and said body member being fused together at the interfaces therebetween to provide an integral structure.

References Cited
UNITED STATES PATENTS

| | | | |
|---|---|---|---|
| 2,263,674 | 11/1941 | Casella | 43—44.9 |
| 2,897,625 | 8/1959 | Spitzli et al. | 43—43.1 |
| 3,128,504 | 4/1964 | Gewecke | 264—248 X |

WARNER H. CAMP, *Primary Examiner.*